(12) United States Patent
McGranahan

(10) Patent No.: US 7,936,960 B2
(45) Date of Patent: May 3, 2011

(54) OPTICAL FIBER SLACK STORAGE FOR SPLICE TRAYS AND SPLICE ASSEMBLIES

(75) Inventor: Danny McGranahan, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/595,723

(22) Filed: Nov. 9, 2006

(65) Prior Publication Data
US 2008/0112680 A1    May 15, 2008

(51) Int. Cl.
*G02B 6/00* (2006.01)
(52) U.S. Cl. ........................... 385/135; 385/134; 385/136
(58) Field of Classification Search .................. None
See application file for complete search history.

(56) References Cited

U.S. PATENT DOCUMENTS

| | | | |
|---|---|---|---|
| 4,480,449 A * | 11/1984 | Getz et al. ..................... | 68/12.02 |
| 5,074,635 A | 12/1991 | Justice et al. .................... | 385/95 |
| D330,368 S | 10/1992 | Bourgeois et al. ............ | D13/154 |
| 5,260,957 A | 11/1993 | Hakimi et al. .................. | 372/39 |
| 5,323,480 A | 6/1994 | Mullaney et al. ............. | 385/135 |
| 5,383,051 A | 1/1995 | Delrosso et al. .............. | 359/341 |
| 5,420,956 A | 5/1995 | Grugel et al. ................. | 385/135 |
| 5,438,641 A | 8/1995 | Malacarne ..................... | 385/137 |
| 5,553,183 A * | 9/1996 | Bechamps ...................... | 385/95 |
| 5,553,186 A | 9/1996 | Allen ............................. | 385/135 |
| 5,590,234 A | 12/1996 | Pulido ........................... | 385/135 |
| 5,602,954 A | 2/1997 | Nolf et al. ..................... | 385/135 |
| 5,613,030 A | 3/1997 | Hoffer et al. .................. | 385/135 |
| 5,617,501 A | 4/1997 | Miller et al. ................... | 385/134 |
| 5,689,605 A | 11/1997 | Cobb et al. .................... | 385/135 |
| 5,694,511 A | 12/1997 | Pimpinella et al. ............ | 385/134 |
| 5,751,882 A | 5/1998 | Daems et al. .................. | 385/135 |
| 5,758,004 A | 5/1998 | Alarcon et al. ................ | 385/135 |
| 5,793,920 A | 8/1998 | Wilkins et al. ................ | 385/135 |

(Continued)

FOREIGN PATENT DOCUMENTS

FR         2748576         11/1997

OTHER PUBLICATIONS

Bing et al., "Low-loss Holey Fiber", Aug. 2005, Hitachi Cable Review, No. 24, pp. 1-4.*

(Continued)

*Primary Examiner* — Uyen-Chau N Le
*Assistant Examiner* — Chad H Smith
(74) *Attorney, Agent, or Firm* — John H. Vynalek

(57) ABSTRACT

There is provided splice trays and splice assemblies that include one or more optical fiber routing guides for optical fiber slack storage. The optical fiber routing guides are associated with individual or select groupings of splice holders in order to eliminate slack storage generally around the perimeter of the splice tray. Therefore, the optical fibers of one or a select number of splices may be routed separately from other optical fibers to enable technicians to more easily manipulate the fibers. In addition, optical fiber routing guides are included with a splice assembly in order to eliminate slack storage generally around the splice tray. The optical fiber routing guides additionally may define bend radiuses of between about 0.1 inch and about 0.5 inch. Therefore, splice trays and splice assemblies comprising the optical fiber routing guides may provide more convenient access and/or define smaller sizes compared to previous splice trays and splice assemblies.

19 Claims, 4 Drawing Sheets

U.S. PATENT DOCUMENTS

| | | | | |
|---|---|---|---|---|
| 5,793,921 | A | 8/1998 | Wilkins et al. | 385/135 |
| 5,796,908 | A | 8/1998 | Vicory | 385/135 |
| 5,802,237 | A | 9/1998 | Pulido | 385/135 |
| 5,825,961 | A | 10/1998 | Wilkins et al. | 385/135 |
| 5,832,162 | A | 11/1998 | Sarbell | 385/99 |
| 5,835,657 | A * | 11/1998 | Suarez et al. | 385/135 |
| 5,835,658 | A | 11/1998 | Smith | 385/136 |
| 5,870,519 | A | 2/1999 | Jenkins et al. | 385/135 |
| 5,881,200 | A | 3/1999 | Burt | 385/142 |
| 5,884,003 | A | 3/1999 | Cloud et al. | 385/135 |
| 5,892,877 | A | 4/1999 | Meyerhoefer | 385/136 |
| 6,009,225 | A | 12/1999 | Ray et al. | 385/135 |
| 6,215,938 | B1 | 4/2001 | Reitmeier et al. | 385/135 |
| 6,263,141 | B1 | 7/2001 | Smith | 385/135 |
| 6,269,212 | B1 | 7/2001 | Schiattone | 385/135 |
| 6,275,641 | B1 | 8/2001 | Daoud | 385/135 |
| 6,292,614 | B1 | 9/2001 | Smith et al. | 385/135 |
| 6,353,697 | B1 | 3/2002 | Daoud | 385/136 |
| 6,379,166 | B1 | 4/2002 | Hagarty et al. | 439/135 |
| 6,434,313 | B1 | 8/2002 | Clapp, Jr. et al. | 385/135 |
| 6,456,772 | B1 * | 9/2002 | Daoud | 385/135 |
| 6,480,660 | B1 | 11/2002 | Reitmeier et al. | 385/135 |
| 6,567,601 | B2 | 5/2003 | Daoud et al. | 385/135 |
| 6,577,801 | B2 | 6/2003 | Broderick et al. | 385/125 |
| 6,594,434 | B1 | 7/2003 | Davidson et al. | 385/135 |
| 6,612,515 | B1 | 9/2003 | Tinucci et al. | 242/388.1 |
| 6,625,374 | B2 | 9/2003 | Holman et al. | 385/135 |
| 6,710,366 | B1 | 3/2004 | Lee et al. | 257/14 |
| 6,795,633 | B2 * | 9/2004 | Joseph, II | 385/135 |
| 6,819,857 | B2 | 11/2004 | Douglas et al. | 385/135 |
| 6,865,334 | B2 | 3/2005 | Cooke et al. | 385/139 |
| 6,870,997 | B2 | 3/2005 | Cooke et al. | 385/135 |
| 6,879,545 | B2 | 4/2005 | Cooke et al. | 367/149 |
| 6,934,451 | B2 | 8/2005 | Cooke et al. | 385/100 |
| 6,968,107 | B2 | 11/2005 | Belardi et al. | 385/127 |
| 7,027,695 | B2 | 4/2006 | Cooke et al. | 385/105 |
| 7,054,513 | B2 | 5/2006 | Herz et al. | 385/12 |
| 7,215,865 | B2 * | 5/2007 | Bellekens et al. | 385/135 |
| 2004/0240825 | A1 * | 12/2004 | Daoud et al. | 385/135 |
| 2006/0098931 | A1 * | 5/2006 | Sibley et al. | 385/135 |
| 2006/0133753 | A1 | 6/2006 | Nelson et al. | 385/125 |
| 2006/0251373 | A1 * | 11/2006 | Hodge et al. | 385/135 |
| 2007/0104447 | A1 * | 5/2007 | Allen | 385/135 |

OTHER PUBLICATIONS

Draka ,"BendBright xs Single Mode Optical Fibre", Draka Draka Cometeq | Optical Fibre, Aug. 2006 pp. 1-2.*

Bing et al., "Low loss Holey Fiber", Hitachi Cable Review, No. 24, (Aug. 2005), pp. 1-4.* www.everythingfiberoptic.com, Splice Trays, Copyright © At Last Electronics Corp. 2006.

www.siemon.com/us/oem/splice_tray.asp, © 1995-2006 Siemon, www.siemon.com, The Siemon Company, Siemon Business Park, 1010 Siemon Drive, Watertown, CT 06795-0400 USA.

www.adckrone.com, Products and Services, Splice Trays, Copyright © 2006, ADC.

Corning Cable Systems, Splice Trays, A LANscape® Solutions Product, Product Specifications (5 pages), Corning Cable Systems LLC, P.O. Box 489, Hickory, NC 28603-0489 USA, May 2005.

Hitachi Cable Review No. 24, "Low-loss Holey Fiber", Aug. 2005, 5 pages.

Draka, Draka Comteq | Optical Fibre, "BendBright" Single Mode Optical Fibre, Enhanced low macrobending sensitive, low water peak fibre, Product Type: G.652D, Coating Type: ColonLock™ and Natural, Issue Date: Aug. 2006, Supersedes. –/–, www.drakafibre.com | www.draka.com, 2 pages.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Patent Cooperation Treaty, International Search Report for International Application No. PCT/US07/023631, Apr. 11, 2008, 3 pages.

* cited by examiner

OPTICAL FIBER SLACK STORAGE FOR SPLICE TRAYS AND SPLICE ASSEMBLIES

BACKGROUND OF THE INVENTION

1. Field of the Invention

The present invention is related to fiber optic splice equipment, and more particularly, to fiber optic splice equipment adapted to provide convenient slack storage for the optical fibers.

2. Description of Related Art

Fiber optic data and communication systems employ splice trays and splice assemblies at various points along a distribution network. For example, a splice assembly may be used to connect drop cables to an express cable. The drop cables may lead to individual businesses or dwellings. The splice assembly often has a frame with an end cap on one or both ends to define a splice closure. The frame has provisions for receiving splice trays and storing slack fiber optic cable. The express cable typically has a jacket surrounding a number of buffer or express tubes. Each express tube typically has a plurality of optical fibers, usually from six to about twelve. The jacket of the cable will be stripped off and sealed around an aperture in the end cap of the splice closure. Some of the tubes will be cut and extend between the end cap and splice trays attached to the frame. Other express tubes may remain uncut and will pass in a loop around the frame and back out the end cap.

The splice trays typically have splice organizers comprising one or more splice holders for retaining splices that connect individual optical fibers, such as fibers from the express tubes, to drop cable fibers. FIG. 1 illustrates a prior art splice tray 10 comprising a splice organizer 12 of multiple splice holders 14. The splice holders 14 are adapted to selectively receive a splice 16 that optically connects a first optical fiber 20 and a second optical fiber 22. The splice 16 may be formed by any conventional splice technique, such as mechanical splicing or fusion splicing. In order to splice and perform other related manipulation of the optical fibers, optical fiber slack is typically readily available, for example, to allow the fibers to be properly positioned for splicing and/or to position the splice 16 in the splice holder 14 without bending any portion of the optical fiber beyond the minimum bend radius of the optical fiber (which may result in performance degradation and/or failure of the optical fiber). Conventional splice trays, such as the splice tray 10 of FIG. 1, typically provide slack storage within the perimeter 24 of the splice tray in which the optical fibers are wound a number of times against the inner surface of the side wall and/or possibly against a retainer device 26, such as the overhanging lip that projects inwardly from the side walls of the splice tray. Such splice trays define a certain amount of area to provide the desired slack storage with the required bend radius for the optical fibers. In addition, the slack storage is a collection of all the optical fibers associated with the splice tray 10, thus complicating a technician's task of selecting one or more specific optical fibers from the collection for subsequent manipulation, such as splicing.

FIG. 2 illustrates a prior art splice assembly 30 including a splice tray 10 similar to the one described above with respect to FIG. 1. The splice assembly 30 comprises a frame to which the splice tray 10 is joined. The frame defines a perimeter 32 along with retainer devices 34 to provide slack storage for the optical fibers 36 and 38 associated with the splice tray 10. The optical fibers 36 and 38 may be jacketed optical fibers, buffered optical fibers, and/or bare optical fibers and may comprise any number of optical fibers (optical fibers 36 and 38 are representative only). The optical fibers 36 and 38 are wound about the frame such that the retainer devices defined along the perimeter generally keep the optical fibers within the inner perimeter of the splice assembly 30. The optical fibers 36 and 38 encircle the splice tray 10 thus requiring the splice assembly to define a size larger than the splice tray.

Therefore, a need exists for splice trays and/or splice assemblies that define a generally smaller area for at least the reasons of reduced material costs, easier hardware handling, and/or improved aesthetics. In addition, there exists a need for splice trays and/or splice assemblies that afford convenient access to one or more optical fibers to facilitate selective manipulation by a technician.

BRIEF SUMMARY OF THE INVENTION

The various embodiments of the present invention address the above needs and achieve other advantages by providing splice trays and/or splice assemblies comprising novel fiber routing guides. The fiber routing guides define shapes, sizes, and/or locations to provide convenient access to select optical fibers and allow the splice tray and/or splice assembly to define smaller areas compared to conventional splice trays and/or splice assemblies.

One embodiment of the present invention defines a splice tray for accommodating at least one splice of two or more optical fibers. The splice tray includes at least one splice holder that is joined to the splice tray and that is adapted to selectively receive a splice that optically connects a first optical fiber and a second optical fiber. The splice tray further includes at least one optical fiber routing guide associated with the splice holder such that the optical fiber routing guide is adapted to provide slack storage for only the optical fibers associated with the splice received by the splice holder. Some embodiments of the present invention include optical fiber routing guides having semicircular hubs proximate the axial ends of the splice holders and/or defining a bend radius of between 0.1 inch and 0.5 inch. The splice tray of further embodiments include a perimeter that is free of retainer devices as the slack storage is provided about the splice holders and not about the inner perimeter of the splice tray.

Alternative embodiments of the present invention provide a splice tray with a plurality of splice holders adapted to selectively receive splices optically connecting optical fibers associated with the respective splice. The splice tray also includes optical fiber routing guides adapted to provide slack storage for the optical fibers associated with at least one, but not all, of the splice holders of the plurality of splice holders joined to the splice tray. Further embodiments of the present invention include an optical fiber routing guide associated with each of the splice holders, while further embodiments define a ratio of splice holders to optical fiber routing guides that is less than or equal to two. The optical fibers of some embodiments of the present invention comprise bend performance optical fibers.

Still further embodiments of the present invention provide splice assemblies comprising a frame and a splice tray joined to the frame. Also joined to the frame is at least one optical fiber routing guide, which is adapted to provide slack storage for the associated optical fibers without the optical fibers substantially encircling the splice tray. The frame of the splice assembly of certain embodiments of the present invention are free of retainer devices. Therefore, the splice trays and/or splice assemblies of various embodiments of the present invention provide convenient access to optical fibers associated with splices yet define smaller sizes than conventional splice trays and/or splice assemblies.

BRIEF DESCRIPTION OF THE SEVERAL VIEWS OF THE DRAWINGS

Figure 1:
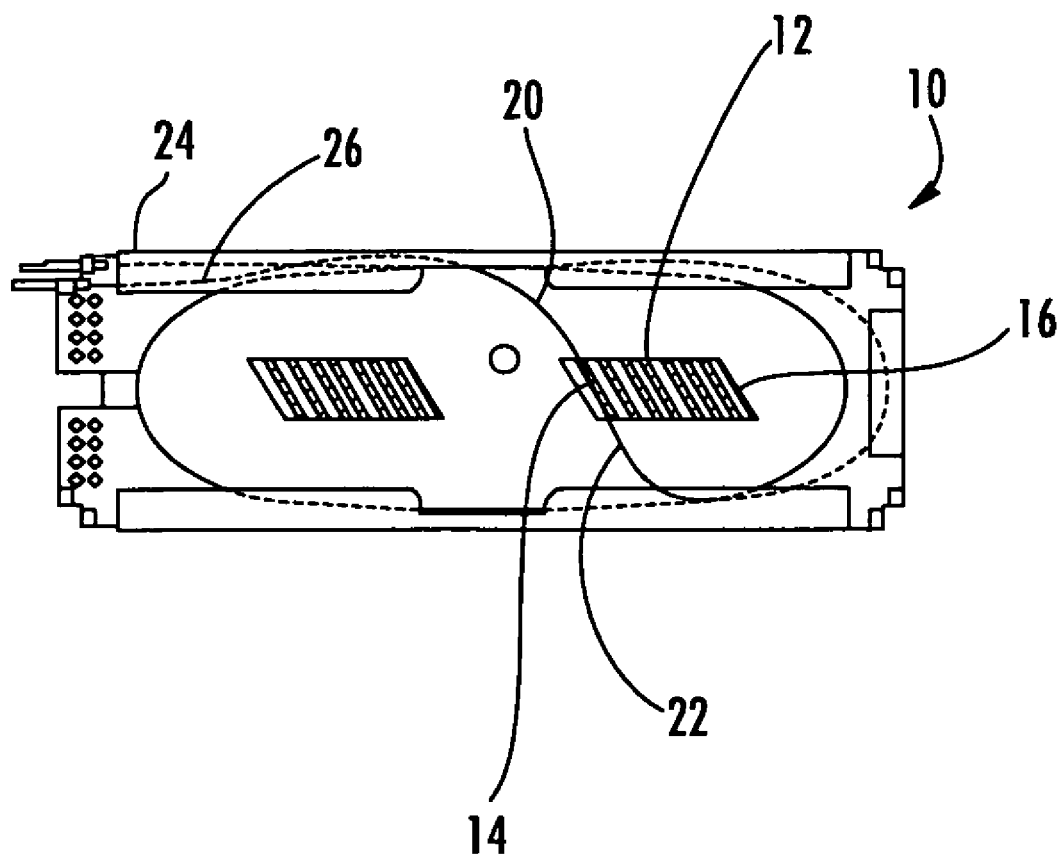
Figure 2:
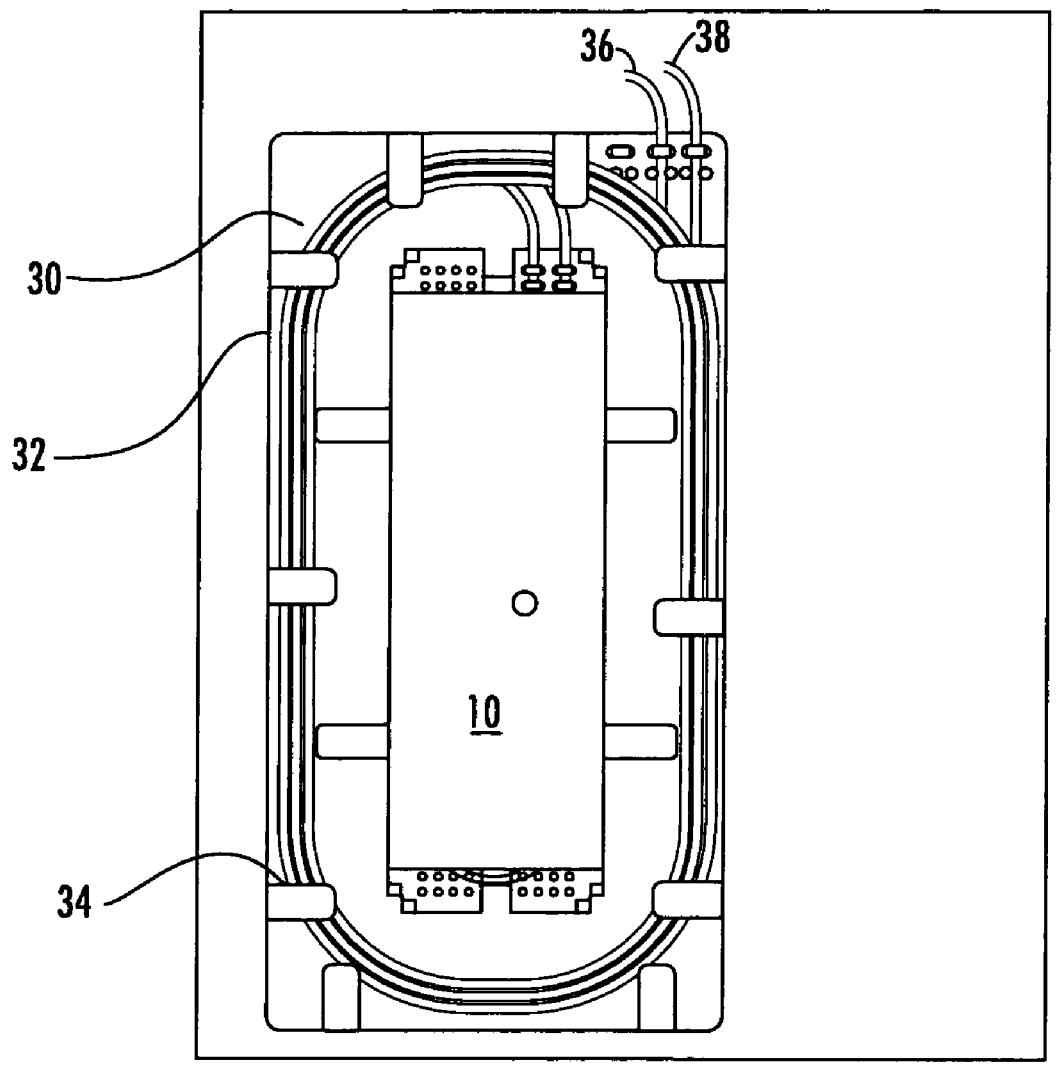
Figure 3:
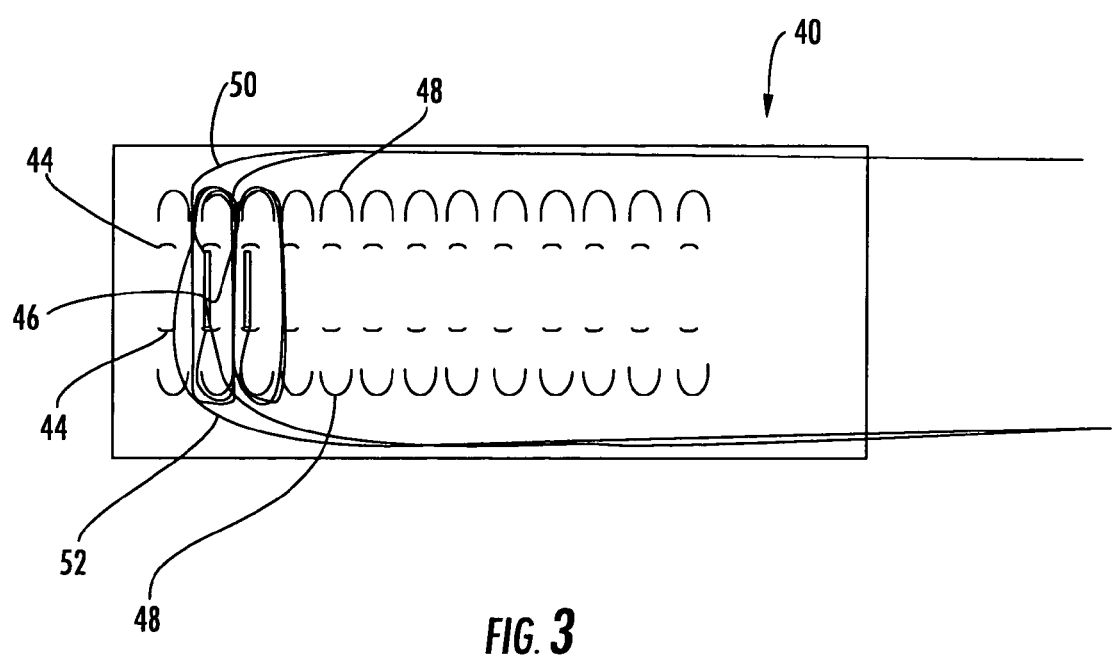
Figure 4:
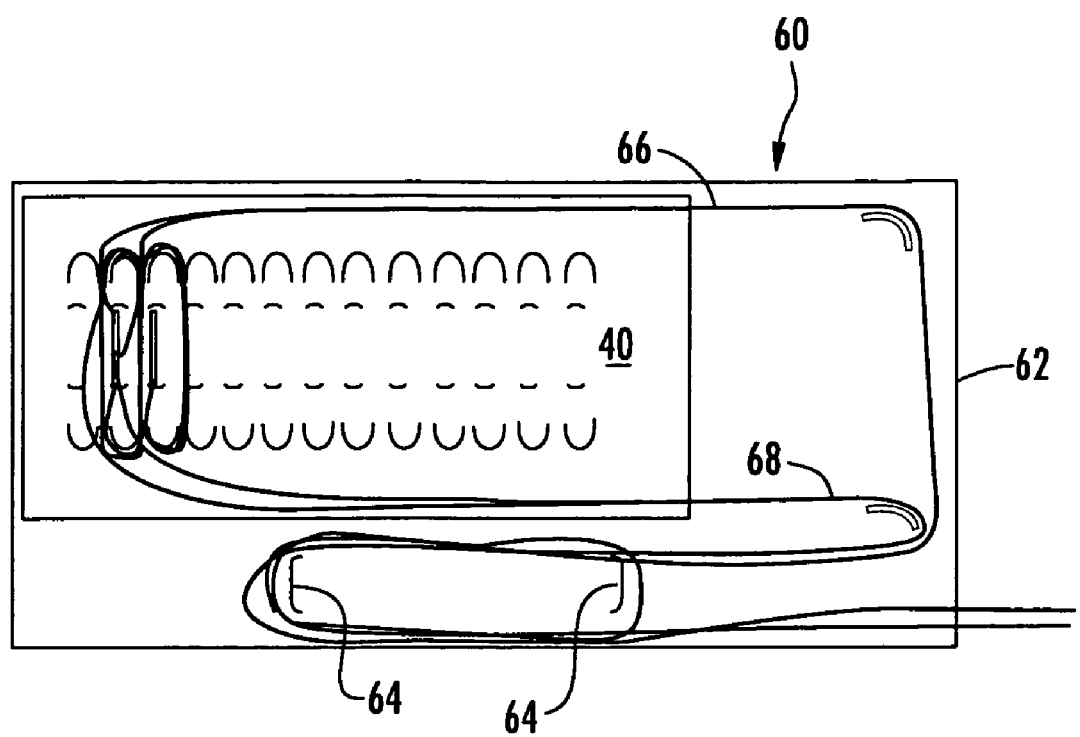

Having thus described the invention in general terms, reference will now be made to the accompanying drawings, which are not necessarily drawn to scale and are meant to be illustrative and not limiting, and wherein:

FIG. 1 is a top perspective view of a prior art splice tray, illustrating the optical fiber slack storage generally about the inner perimeter of the splice tray;

FIG. 2 is a top perspective view of a prior art splice assembly, illustrating the optical fiber slack storage generally disposed around the splice tray and generally about the inner perimeter of the splice assembly;

FIG. 3 is a top perspective view of a splice tray in accordance with a first embodiment of the present invention, illustrating optical fiber routing guides adapted for slack storage for the two spliced optical fibers; and FIG. 4 is a top perspective view of a splice assembly used in conjunction with the splice tray of FIG. 3, illustrating optical fiber routing guides to provide optical fiber slack storage without the optical fibers substantially encircling the splice tray.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing convenient optical fiber slack storage are described and shown in the accompanying drawings with regard to specific types of splice equipment, it is envisioned that the functionality of the various apparatus and methods may be applied to any now known or hereafter devised splice equipment in which it is desired to provide convenient optical fiber slack storage. Like numbers refer to like elements throughout.

With reference to FIG. 3, a splice tray 40 in accordance with one embodiment of the present invention is illustrated. The splice trays and splice assemblies of the present invention disclosed herein are to be considered non-limiting, as the present invention includes all splice equipment adapted to accommodate optical connections between two or more optical fibers, regardless of shape, size, number of splices, etc. In addition, whereas the splice assembly of the embodiment disclosed herein includes a splice tray of the present invention, alternative embodiments of the splice assembly include conventional splice trays and/or alternative splice trays. Similarly, the splice tray of the embodiment disclosed herein may be used in the splice assembly of the embodiment disclosed herein, in conventional splice assemblies, and/or alternative splice assemblies.

The splice tray 40 of FIG. 3 accommodates splices of optical fibers to allow technicians convenient access to the splices and/or optical fibers when performing splicing operations. The splice tray 40 includes a plurality of splice holders 44 that are joined to the splice tray in any suitable fashion, including, but not limited to, by fasteners, by integrated molding, by welding, or the like. The splice holders of some embodiments of the present invention are defined in a splice organizer, whereas in other embodiments the splice holders are stand-alone devices not defining a single splice organizer or multiple splice organizers. Each splice holder 44 of the embodiment of FIG. 3 is adapted to selectively receive a splice 46. The splice holders 44 of FIG. 3 each define two brackets or the like opposed at axial ends of the splice holder to selectively receive a splice; however, the splice holders of further embodiments of the present invention comprise slots or channels (such as disclosed in FIG. 1) or other structures to selectively receive splices.

The splice tray 40 of FIG. 3 also comprises optical fiber routing guides 48 that are associated with the splice holders 44. In the embodiment of FIG. 3, the optical fiber routing guides 48 are adapted to provide slack storage for only the optical fibers 50 and 52 associated with the splice 46. The optical fiber routing guide 48 of FIG. 3 comprises a generally semicircular hub proximate each of the opposed axial ends of the splice holder 44. Further embodiments of the present invention include optical fiber routing guides defining concentric and/or parallel walls defining a channel to receive one or more optical fibers and/or defining retaining tabs to keep the routed optical fibers in a desired position. Referring again to FIG. 3, the hubs of the optical fiber routing guide 48 provide a surface with a minimum bend radius along which the optical fibers 50 and 52, which are optically connected by the splice 46, may be routed to provide slack storage for the optical fibers and to provide technicians with convenient access to the optical fibers. Optical fiber routing guides of further embodiments of the present invention may define one or more hubs of any shape, size, and/or relative location in order to provide slack storage for the optical fibers of the splice tray.

By providing the slack storage for the optical fibers individually for each of the splices, a technician can more conveniently identify and access the optical fibers of concern when handling a splice (i.e., when creating a splice, testing a splice, etc.). Referring again to the embodiment of FIG. 3, only two splices are illustrated as being selectively received in the splice holders; however, it should be appreciated that any number of splices may be selectively received by the plurality of splice holders, with the associated optical fibers routed about the respective optical fiber routing guides. Further embodiments of the present invention comprise splice holders adapted to selectively receive two or more splices, such as splices stacked in a generally vertical fashion, and such embodiments may comprise one or more optical fiber routing guides associated with each of the splice holders.

The splice trays of various embodiments of the present invention also comprise optical fiber routing guides that are adapted to provide slack storage for the optical fibers associated with at least one but not all of the splice holders of the plurality of splice holders joined to the splice tray. For example, the fiber routing guides of some embodiments of the present invention are associated with two splice holders, such that slack storage is provided for only the optical fibers associated with the two splices selectively received by the two splice holders. In such embodiments, the splice tray defines a ratio of splice holders to optical fiber routing guides that is equal to two. Still further embodiments of the present invention define alternative ratios of splice holders to optical fiber routing guides.

By providing optical fiber routing guides associated with the splice holders, various embodiments of the present invention obviate the need to provide slack storage for the optical fibers within the inner perimeter of the splice tray, such as against the inner surface of the side wall and/or possibly against a retainer device, such as the overhanging lip that projects inwardly from the side walls of the splice tray, as provided in prior art splice trays. Therefore, splice trays of certain embodiments of the present invention, such as splice tray 40 of FIG. 3, define a perimeter free of retainer devices. The splice trays of various embodiments of the present invention may include certain features or portions along the perimeter of the splice tray, such as devices to selectively fix the optical fibers to the splice tray to avoid undesired tangling of the fibers or disconnection of the splices; however, such features are generally not adapted for slack storage of the optical fibers.

Regarding the optical fibers, some embodiments of the present invention include various types of optical fibers which include, but are not limited to, low bend sensitivity optical fibers, bend optimized optical fibers, and bend insensitive optical fibers, all of which are referred to generically herein as "bend performance optical fiber." One specific example of bend performance optical fiber is microstructured optical fibers. Microstructured optical fibers comprise a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. The microstructured optical fibers of various embodiments define single-mode transmission optical fiber and/or multi-mode transmission optical fiber.

The microstructured optical fiber of some embodiments of the present invention comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Use of such bend performance optical fiber enables the fibers to undergo a minimum bend radius while providing desired optical performance. Accordingly, some embodiments of the present invention comprise optical fiber routing guides that define a bend radius of between about 0.01 inch to about 1.0 inch, more preferably between about 0.1 inch and 0.5 inch, and still more preferably of about 0.2 inch. The optical fiber routing guides of some embodiments of the present invention do not define a curved routing guide, but do provide for the minimum bend radius of the particular optical fiber, such as bend performance optical fiber, associated with the splice tray.

Turning now to the splice assembly 60 of FIG. 4, the splice assembly comprises a frame defining a perimeter 62. The splice tray 40 of FIG. 3 is joined to the frame of the splice assembly 60; however, splice assemblies of further embodiments of the present invention comprise alternative splice trays. Also joined to the frame of the splice assembly 60 of FIG. 4 is at least one optical fiber routing guide 64. The optical fiber routing guide 64 of FIG. 4 defines two hubs that are proximate the splice tray such that the splice assembly defines a size and/or shape that is smaller than prior art splice assemblies. The hubs of the optical fiber routing guide 64 are shown as being generally axially opposed to one another; however, optical fiber routing guides of further embodiments may define one or more hubs of any shape, size, and/or relative location in order to provide slack storage for the optical fibers of the splice assembly. The optical fiber routing guide 64 of FIG. 4 is adapted to provide slack storage for the optical fibers 66 and 68 that are spliced in splice tray 40, wherein the optical fibers comprise buffer tubes. Further embodiments of the present invention include splice assemblies adapted to provide slack storage for optical fibers with or without coatings, buffer tubes, jackets, and/or the like.

Similar to the splice tray 40 of FIG. 3, the splice assembly 60 of FIG. 4 defines a perimeter free of retainer devices. Because the slack storage is provided by the optical fiber routing guide 64, the perimeter 62 of the frame does not include retainer devices to provide slack storage about the inner perimeter of the frame. Furthermore, the optical fiber routing guide provides slack storage for the optical fibers without the optical fibers substantially encircling the splice tray 40. In addition, similar to the optical fiber routing guides 48 of the splice tray 40 of FIG. 3, the optical fiber routing guides 64 of the splice assembly 60 of FIG. 4 define a bend radius of between about 0.01 inch to about 1.0 inch, more preferably between about 0.1 inch and 0.5 inch, and still more preferably of about 0.2 inch. The splice assembly of various embodiments of the present invention also include other features and/or devices joined to the frame to provide for routing and/or selectively fixing the optical fibers associated with the splice assembly.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A splice tray for accommodating at least one splice of two or more optical fibers, the splice tray comprising:
   at least one splice holder joined to the splice tray, wherein the at least one splice holder is adapted to selectively receive a splice that optically connects a first optical fiber and a second optical fiber, wherein the splice tray is configured to receive a plurality of splices; and
   at least one or more optical fiber routing guides each associated with a single respective splice;
   wherein the optical fiber routing guide is adapted to provide slack storage for only the optical fibers associated with the single respective splice wherein the splice defines opposed axial ends, and wherein a respective optical fiber routing guide comprises a generally semicircular hub proximate each axial end of the respective splice.

2. A splice tray according to claim 1 further comprising a splice organizer, wherein the at least one splice holder is defined in the splice organizer.

3. A splice tray according to claim 1, wherein the splice tray comprises an optical fiber routing guide associated with each splice of the splice tray.

4. A splice tray for accommodating at least one splice of two or more optical fibers, the splice tray comprising:
at least one splice holder joined to the splice tray, wherein the at least one splice holder is adapted to selectively receive a splice that optically connects a first optical fiber and a second optical fiber, wherein the splice tray is configured to receive a plurality of splices; and
at least one or more optical fiber routing guides each associated with a single respective splice;
wherein the optical fiber routing guide is adapted to provide slack storage for only the optical fibers associated with the single respective splice wherein the splice defines opposed axial ends, and wherein the splice tray defines a perimeter free of retainer devices.

5. A splice tray according to claim 1, wherein at least one of the two optical fibers comprises a bend performance optical fiber.

6. A splice tray according to claim 1, wherein the at least one optical fiber routing guide defines a bend radius of about between about 0.1 inch and about 0.5 inch.

7. A splice tray according to claim 1, wherein the at least one optical fiber routing guide defines a bend radius of about 0.2 inch.

8. A splice assembly comprising:
a frame;
a splice tray joined to the frame, wherein the splice tray comprises a plurality of splice holders joined to the splice tray, wherein the splice holders are adapted to selectively receive a splice that optically connects optical fibers associated with the splice;
at least one optical fiber routing guide associated with the splice tray; and
at least one optical fiber adapted for splicing to a second optical fiber, wherein the at least one optical fiber defines a bend performance optical fiber and the at least one optical fiber routing guide defines a bend radius of between about 0.1 inch and about 0.5 inch, wherein the frame defines a perimeter free of retainer devices.

9. A splice assembly according to claim 8, wherein the bend performance optical fiber comprises a microstructured optical fiber.

10. A splice assembly according to claim 8, wherein the at least one optical fiber routing guide defines a bend radius of about 0.2 inch.

11. A splice assembly according to claim 8 wherein the splice tray comprises an optical fiber routing guide associated with each of the splice holders of the splice tray.

12. A splice assembly for accommodating at least one splice of two or more optical fibers, the splice assembly comprising:
a frame;
a splice tray joined to the frame, wherein the splice tray comprises at least one splice holder joined to the splice tray, wherein the at least one splice holder is adapted to selectively receive a splice that optically connects a first optical fiber and a second optical fiber;
an optical fiber routing guide having axially opposed hubs joined to the frame proximate the splice tray;
wherein the optical fiber routing guide is adapted to provide slack storage for one or more of the optical fibers without the optical fibers substantially encircling the splice tray, and wherein the splice assembly defines a perimeter free of retainer devices, and wherein the splice tray further comprises an optical fiber routing guide associated with each of the splice holders of the splice tray.

13. A splice assembly according to claim 12, wherein at least one of the two or more optical fibers comprises a bend performance optical fiber.

14. A splice assembly according to claim 12, wherein the optical fiber routing guide defines a bend radius of between about 0.1 inch and about 0.5 inch.

15. A splice assembly according to claim 12, wherein the optical fiber routing guide defines a bend radius of about 0.2 inch.

16. A splice tray for accommodating at least one splice of two or more optical fibers, the splice tray comprising:
at least one splice holder joined to the splice tray, wherein the at least one splice holder is adapted to selectively receive a splice that optically connects a first optical fiber and a second optical fiber, wherein the splice tray is configured to receive a plurality of splices and defines a perimeter free of retainer devices; and
at least one optical fiber routing guide associated with a respective splice;
wherein the optical fiber routing guide is adapted to provide slack storage for only the optical fibers associated with the respective splice.

17. A splice tray according to claim 16 further comprising a splice organizer, wherein the at least one splice holder is defined in the splice organizer.

18. A splice tray according to claim 16, wherein the splice defines opposed axial ends and wherein a respective optical fiber routing guide comprises a generally semicircular hub proximate each axial end of the respective splice.

19. A splice tray according to claim 16, wherein at least one of the two optical fibers comprises a bend performance optical fiber.

* * * * *